(12) United States Patent
Ricard et al.

(10) Patent No.: US 11,198,501 B2
(45) Date of Patent: Dec. 14, 2021

(54) ACTUATOR UPPER ATTACHMENT

(71) Applicant: GOODRICH ACTUATION SYSTEMS SAS, Saint-Ouen-l'Aumône (FR)

(72) Inventors: Quentin Ricard, Eaubonne (FR); Raphael Medina, Ecouen (FR)

(73) Assignee: GOODRICH ACTUATION SYSTEMS SAS, Saint-Ouen-l'Aumône (FR)

( * ) Notice: Subject to any disclaimer, the term of this patent is extended or adjusted under 35 U.S.C. 154(b) by 175 days.

(21) Appl. No.: 16/712,408

(22) Filed: Dec. 12, 2019

(65) Prior Publication Data
US 2020/0391849 A1 Dec. 17, 2020

(30) Foreign Application Priority Data
Jun. 14, 2019 (EP) .................... 19290039

(51) Int. Cl.
*B64C 13/24* (2006.01)
*B64D 45/00* (2006.01)
*F16H 25/20* (2006.01)

(52) U.S. Cl.
CPC ............. *B64C 13/24* (2013.01); *B64D 45/00* (2013.01); *B64D 45/0005* (2013.01); *F16H 25/2003* (2013.01); *B64D 2045/0085* (2013.01); *F16H 25/205* (2013.01); *F16H 2025/2037* (2013.01)

(58) Field of Classification Search
CPC ....... B64C 13/24; B64C 13/341; B64C 13/28; B64D 45/00; B64D 45/0005; B64D 2045/0085; F16H 25/2003; F16H 25/205; F16H 2025/2037; F16H 2035/103
See application file for complete search history.

(56) References Cited

U.S. PATENT DOCUMENTS

| | | | |
|---|---|---|---|
| 8,033,500 B1 * | 10/2011 | Charafeddine | B64C 13/42 244/75.1 |
| 8,985,510 B2 | 3/2015 | Hale | |
| 10,065,728 B2 | 9/2018 | Cyrot | |
| 10,239,603 B2 | 3/2019 | Medina et al. | |
| 2010/0264263 A1 * | 10/2010 | Shaheen | B64C 13/24 244/99.3 |
| 2018/0162550 A1 | 6/2018 | Hale et al. | |
| 2019/0107185 A1 | 4/2019 | Medina et al. | |

* cited by examiner

*Primary Examiner* — Valentina Xavier
(74) *Attorney, Agent, or Firm* — Cantor Colburn LLP

(57) ABSTRACT

An attachment assembly for connecting an actuator to a frame, a method for manufacturing this attachment assembly and a method for reducing backlash in an attachment assembly. The attachment assembly comprises: an outer yoke having a first end and an opposite second end and defining an internal cavity at said second end. The outer yoke has an aperture provided at its second end connected to the cavity; and an inner yoke located within the cavity. A tie bar having a ball shaped end extends through said aperture such that the ball shaped end is positioned within the cavity and cannot pass through the aperture. A spring is provided at said first end of said outer yoke that is configured to bias the inner yoke in the direction of the aperture. The attachment also includes shearable means for holding the inner yoke.

15 Claims, 6 Drawing Sheets

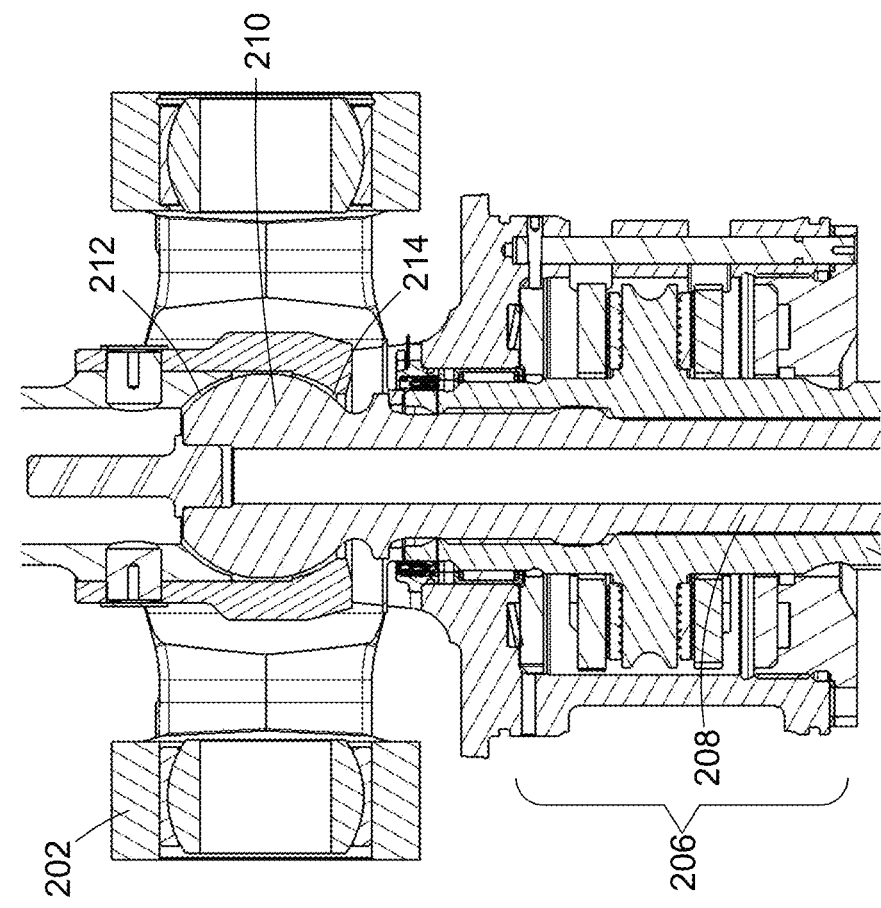
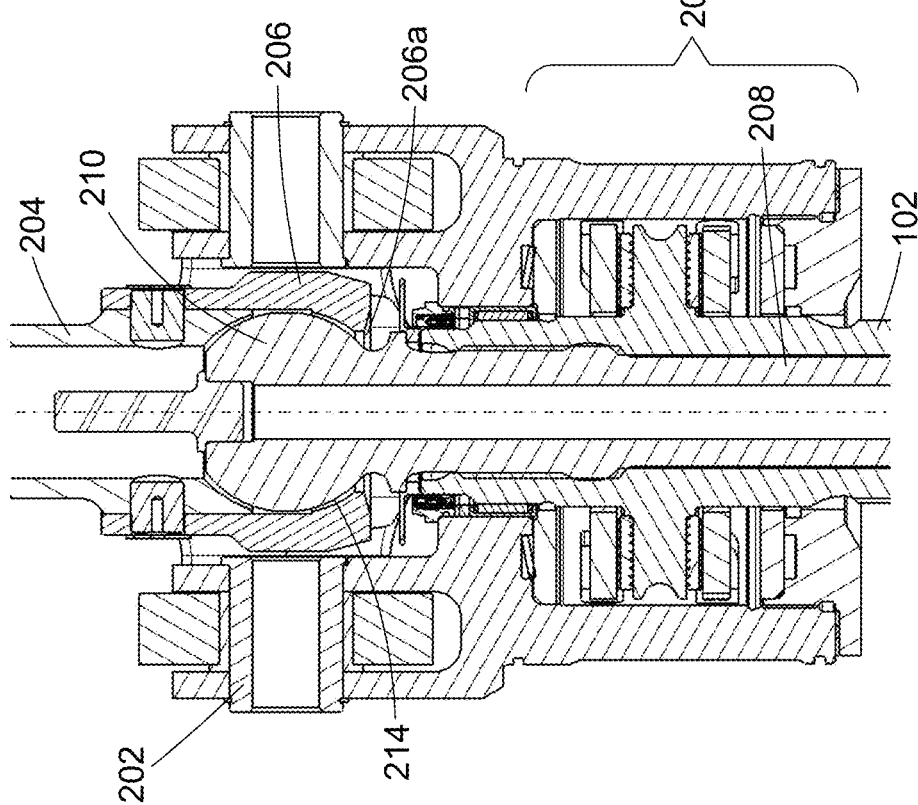
Fig. 2B
PRIOR ART
Fig. 2A
PRIOR ART

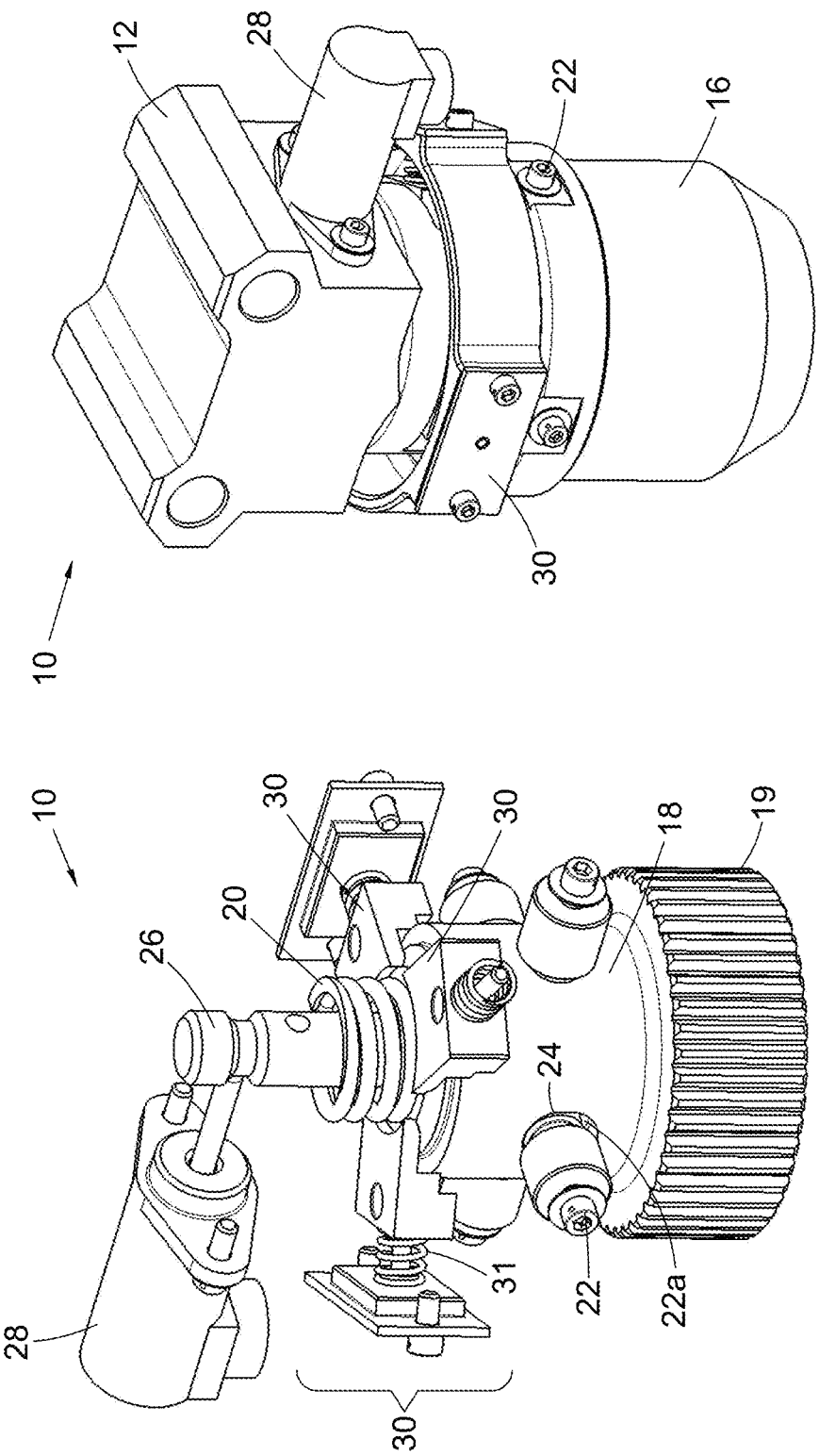

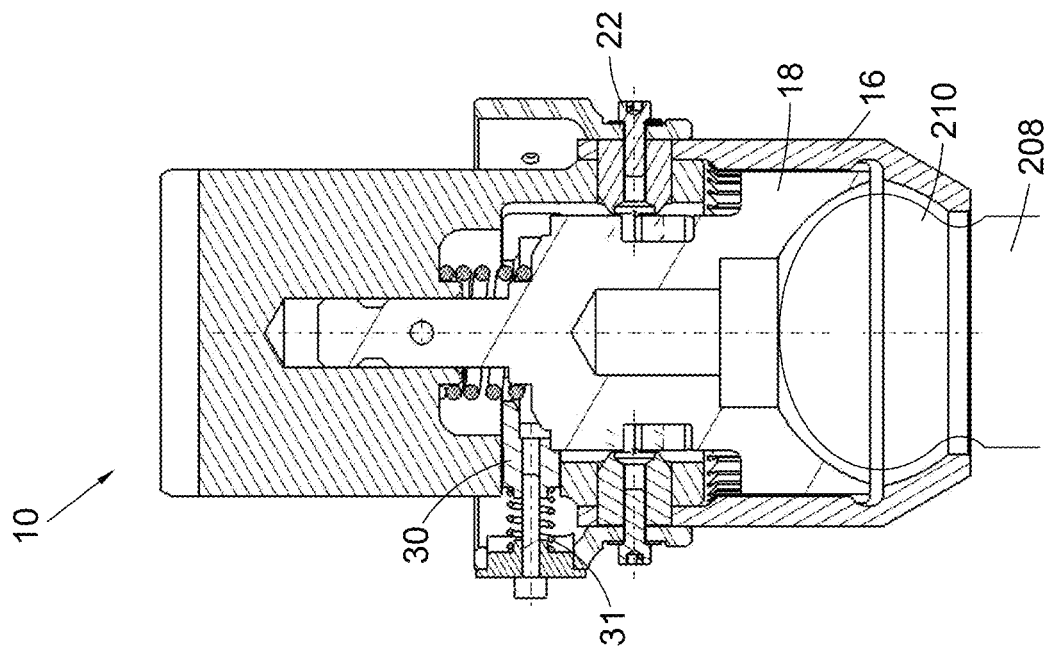
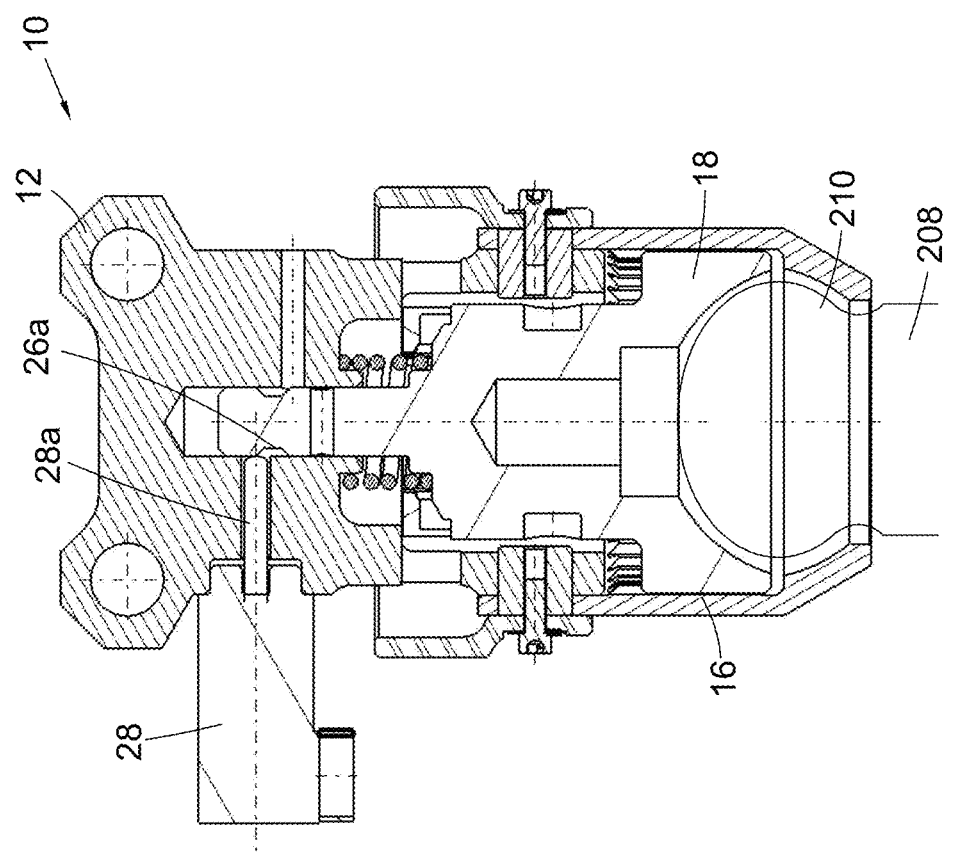

ACTUATOR UPPER ATTACHMENT

FOREIGN PRIORITY

This application claims priority to European Patent Application No. 19290039.7 filed Jun. 14, 2019, the entire contents of which is incorporated herein by reference.

TECHNICAL FIELD

The present disclosure relates to an attachment for an actuator and a method of attaching an actuator to another component. The examples described herein may be used for attaching an actuator to a component such as an aircraft frame or an aircraft stabilizer. Other components may also be used.

BACKGROUND

Actuators are commonly used devices for moving one part of a mechanical system relative to another part. For example, actuators are used extensively throughout aircraft to move flaps and slats relative to the frame of the aircraft, to control the aircraft during flight. One safety-critical actuator is a trimmable horizontal stabilizer actuator (THSA) that controls the trimmable horizontal stabilizer (THS) on an aircraft. Screw actuators are commonly used for a THSA arrangement. The actuator needs to be connected to the frame of the aircraft, at one end, and to the THS at the other end.

The connection to the aircraft frame is commonly called the upper attachment, and the connection to the THS (or horizontal stabilizer surface) is commonly called the lower attachment. Typically, a screw actuator will have a drive portion (e.g. a motor) connected through a gearbox to the frame by the upper attachment, and the drive portion drives rotation of a screw shaft. A nut (which may comprise a plurality of nuts, for redundancy) is disposed on the screw shaft and is held against rotation. This means that rotation of the screw shaft causes the nut to translate along the shaft. The nut is connected to (or part of) the lower attachment that connects to the THS.

As the THSA is a safety-critical part of an aircraft, it is known in the art to provide redundancy in the actuator structure arrangement such that if a primary load path (PLP) fails, a secondary load path (SLP) is engaged so that the THS does not move uncontrollably during flight. At the lower attachment, this is often provided by a primary nut with its primary attachment that provides the PLP and a secondary nut that is connected to the primary nut. The secondary nut provides the SLP and is held relative to the primary nut such that it does not experience loading (and thus does not experience wear/fatigue) while the PLP is engaged. Often the parts forming the secondary load path are designed to jam the actuator when the SLP is engaged (e.g. when the PLP fails, due to wear, fatigue, etc.) This ensures that the THS does not flap about uncontrollably when the PLP fails. Alternatively, in known actuator examples, the secondary load path is not jammed but operates with high clearance (backlash) in the SLP parts, which leads to significant flutter—such arrangements typically contain means to detect engagement of the SLP.

If the THS flutters too much during flight (i.e. under aerodynamic loading), this can cause aircraft structural damage and is thus a catastrophic event. Therefore, it is a certification requirement that the angle of the THS should not flutter beyond an angular range of 0.034°, regardless of whether the PLP or the SLP is engaged. That is, the THS must be held quite securely by the THSA such that the aerodynamic loads on the THS do not cause it to move by more than 0.034°.

When the PLP is engaged, it is known in the art how to meet this 0.034° certification requirement by determining the necessary resilience of the THSA components under aerodynamic loading, the thermal expansion of various components under expected operating conditions, and controlling the cumulative amount of backlash in the THSA system. That is, the designer will combine together the total amounts by which components can deform under expected THS aerodynamic loads, and add the backlash due to thermal expansion, and add the backlash between the primary nut and the screw shaft, and come up with a cumulative backlash value that translates into a maximum flutter, measured in degrees, for the THS.

As above, the SLP must be kept unloaded while the PLP is engaged, so as to avoid wear/fatigue in the SLP. To keep the SLP unloaded during the expected deformation/thermal expansion etc. in the PLP, backlash is introduced to sufficiently space apart the SLP components so that they do not experience loading while the PLP is engaged. This introduces further backlash in the system and, when the SLP is engaged, this further backlash can lead to the 0.034° certification requirement not being met.

In one known example for the lower attachment, the secondary nut has a thinner thread than the primary nut and is held by the primary nut such that the thread of the secondary nut does not touch the thread of the screw shaft while the PLP is engaged. As a result, there is generally significant backlash in the THSA when the SLP is engaged. This backlash is necessary so that the SLP does not experience wear/fatigue while the PLP is engaged, but this also means that the backlash when the SLP is engaged can exceed the aforesaid 0.034° certification requirement. Therefore, it is desirable to provide a backlash reduction system in the THSA such that an initial amount of backlash that is present in the SLP while the SLP is not engaged is reduced when the SLP is engaged.

US 2019/0107185 A1 discloses a known lower attachment system for a THSA that, when a primary nut fails, causes two secondary nuts to move apart from/towards one another so as to cancel the initially-existing backlash between the threads of the secondary nuts and the thread of the screw shaft.

In one known example for the upper attachment, a tie bar is provided. The tie bar extends down the centre of the actuator's screw shaft and rotates with the screw shaft. The tie bar has a ball-shaped end that is set with backlash n a yoke that is connected to the aircraft frame. The yoke substantially encloses the ball-shaped end of the tie bar such that, when the bar is moved under load, e.g. when the SLP is engaged, the tie bar cannot move axially out of the yoke. The aerodynamic loads are then reacted. While the PLP is engaged, the ball-shaped end rotates within, and relative to, the yoke and there is space (backlash) between the ball and yoke so that there is no wear on the ball-shaped end. When the SLP is engaged (e.g. if another portion of the upper attachment fails, such as a gimbal), the tie bar loads against the yoke in compression and/or extension (depending on the direction of aerodynamic loading on the THS). Due to the initial backlash required to space the ball-shaped end of the tie bar from the yoke, there is further backlash in the overall THSA system when the SLP at the upper-end engages. Again, this can lead to the aforesaid 0.034° certification requirement being exceeded when the SLP is engaged.

U.S. Pat. No. 10,239,603 discloses one solution to reduce the backlash at the upper end when the SLP is engaged. This document discloses an upper attachment system for a THSA that grips the end of a tie bar when the SLP is engaged, so as to reduce backlash, by screwing an inner yoke of a two-part yoke towards the top of the tie bar.

The total initial amount of backlash in a THSA includes, inter alia, backlash at the upper attachment and the lower attachment. For the reasons described above, the backlash can increase, sometimes significantly, when the SLP is engaged at one or both of the upper and lower attachments. Thus, it is desirable to provide backlash reduction systems in a THSA that reduce the overall backlash when a SLP is engaged.

SUMMARY

According to a first aspect, the disclosure provides an attachment assembly for connecting an actuator to a frame, the attachment assembly comprising: an outer yoke having a first end and an opposite second end and defining an internal cavity at said second end, the outer yoke having an aperture provided at its second end connected to said cavity; and an inner yoke located within the cavity, said inner yoke having a first end and a second, opposite end and an aperture at said second end of said inner yoke; and a tie bar having a ball shaped end, the tie bar extending through aperture such that the ball shaped end is positioned within the cavity and cannot pass through the aperture, and a spring provided at said first end of said outer yoke that is configured to bias the inner yoke in the direction of said apertures; the attachment assembly further comprising: shearable means for holding the inner yoke in a first position wherein the inner yoke is spaced away from the ball-shaped end of the tie bar; wherein, when the tie bar is loaded against the inner yoke, the shearable means are configured to shear and the spring is configured to move the inner yoke to a second position wherein the inner yoke is in abutment with the ball-shaped end; and the attachment means further comprising latching means that is configured to hold said inner yoke in said second position when said shearable means has been sheared.

The latching means may comprise one or more spring hooks, the, or each, spring hook being mounted to the attachment assembly with a spring biasing the spring hook towards the inner yoke.

When the inner yoke is in the second position, the spring of the, or each, spring hook may move the spring hook to a abut the first end of the inner yoke to prevent movement of the inner yoke away from the ball-shaped end.

The shearable means may comprise one or more fuse pins.

The, or each, fuse pin may extend in a transverse direction and engages with a respective indentation formed in the inner yoke, wherein the or each indentation is larger in an axial direction than an axial size of the fuse pin, such that a gap is provided between an axial edge of the fuse pin and an edge of the indentation, such that the inner yoke may be moved against the bias of the spring without shearing the or each fuse pin.

A sensor may be configured to detect movement of the inner yoke away from the first position, and to output a signal indicating that the secondary load path is engaged when the inner yoke moves away from the first position.

The sensor may comprise a sensor portion that abuts a target formed on the inner yoke when the inner yoke is in the first position, and wherein the sensor portion does not abut the target when the inner yoke is in the second position.

The inner yoke may be blocked against rotation relative to the outer yoke.

According to a second aspect, there is provided a method of reducing backlash in an upper attachment of an actuator when a secondary load path is engaged, the method comprising: mounting a ball-shaped end of a tie bar in a cavity of an outer yoke having a first end and an opposite second end, the outer yoke having an aperture provided at its second end connected to said cavity; wherein a movable inner yoke is located within the cavity; biasing the inner yoke towards the aperture; holding the inner yoke in a first position wherein the inner yoke is spaced away from the ball-shaped end of the tie bar by shearable means (22); shearing the shearable means when the tie bar is loaded against the inner yoke, such that the inner yoke moves to a second position under the bias to a second position wherein the inner yoke is in abutment with the ball-shaped end; latching the inner yoke in the second position.

The step of latching the inner yoke in the second position may comprise spring hooks moving to abut a first end of the inner yoke.

The method may comprise sensing, using a sensor, movement of the inner yoke away from the first position.

The shearable means may comprise one or more fuse pins, wherein the or each fuse pin extends in a transverse direction and engages with a respective indentation formed in the inner yoke, wherein the or each indentation is larger in an axial direction than an axial size of the fuse pin, such that a gap is provided between an axial edge of the fuse pin and an edge of the indentation; the method further comprising testing the upper attachment by moving the inner yoke within the cavity without shearing the or each fuse pin.

The step of testing may include testing function of the sensor by moving the inner yoke away from the first position without shearing the, or each, fuse pin.

The step of testing may include testing the resiliency of a spring that biases the inner yoke towards the aperture.

The step of testing may include testing for jamming of the inner yoke within the cavity.

According to a third aspect, a method of manufacturing an upper attachment of an actuator is described herein, the method comprising: providing an outer yoke having a first end and an opposite second end and defining an internal cavity at said second end, the outer yoke having an aperture provided at its second end leading into said cavity; and providing an inner yoke within the cavity, said inner yoke having a first end and a second, opposite end; and providing a tie bar having a ball shaped end, the tie bar extending through said aperture such that the ball shaped end is positioned within the cavity and cannot pass through the aperture, and providing a spring at said first end of said outer yoke that is configured to bias the inner yoke in the direction of said aperture; the method further comprising: providing a shearable means for holding the inner yoke in a first position wherein the inner yoke is spaced away from the ball-shaped end of the tie bar; wherein the shearable means is configured to shear when the tie bar is loaded against the inner yoke, and the spring is configured to move the inner yoke to a second position wherein the inner yoke is in abutment with the ball-shaped end; and further comprising providing latching means that is configured to hold said inner yoke in said second position when said shearable means has been sheared.

The latching means may comprises spring hooks that are configured to move and abut the first end of the inner yoke.

The method may further comprise providing a sensor that is configured to sense movement of the inner yoke away from the first position.

The shearable means may comprise one or more fuse pins and the method may further comprise positioning the, or each, fuse pin so that it extends in a transverse direction and engages with a respective indentation formed in the inner yoke, wherein the or each indentation is larger in an axial direction than an axial size of the fuse pin, such that a gap is provided between an axial edge of the fuse pin and an edge of the indentation.

The method may further comprise providing means for testing the upper attachment, said means for testing comprising the inner yoke being configured to move within the cavity without shearing the or each fuse pin.

The step of testing may further comprise testing the resiliency of a spring that biases the inner yoke towards the aperture.

The step of testing may include testing for jamming of the inner yoke within the cavity.

DESCRIPTION OF THE FIGURES

Certain embodiments of the present disclosure will now be described in greater detail by way of example only and with reference to the accompanying drawings in which:

FIGS. 2A and 2B show views of a known upper attachment for attaching the known actuator to a frame, e.g. the frame of an aircraft;

FIGS. 4A and 4B show perspective views of the upper attachment according to the present disclosure;

FIGS. 5A and 5B show cross-sectional views of an upper attachment according to the present disclosure when the secondary load path is engaged;

DETAILED DESCRIPTION

Figure 1:
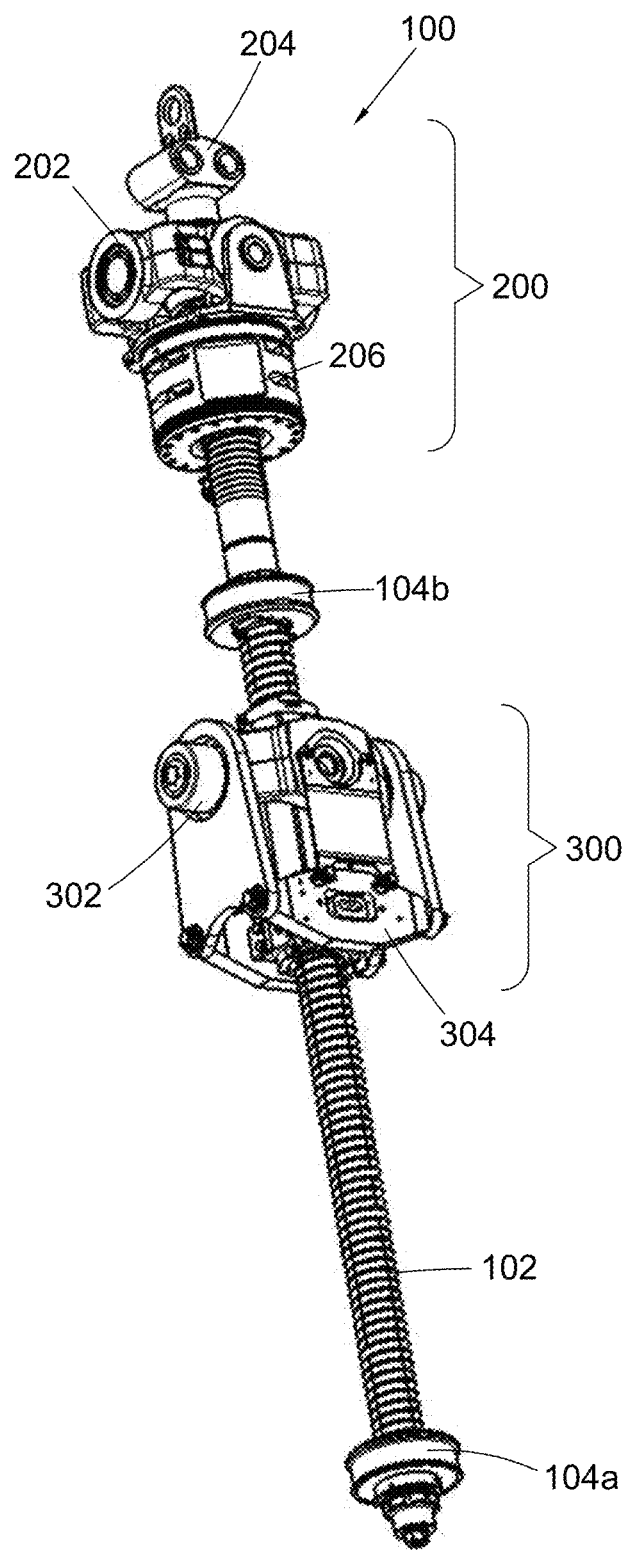
FIG. 1 shows a known actuator.

FIG. 1 shows a known actuator 100 having an upper portion 200 and a lower portion 300. For example, the actuator 100 may be a trimmable horizontal stabilizer actuator (THSA) for an aircraft. The actuator 100 has a screw shaft 102. The lower portion 300 moves along the screw shaft in response to rotation of the screw shaft 102. End stops 104a, 140b are installed on the lower end of the screw shaft 102 and these limit the range of axial movement of the lower portion 300 along the screw shaft 102.

The upper portion 200 has a gimbal 202 that is attachable to a frame of an aircraft (not shown) and an upper attachment 204 that is also attachable to the frame of the aircraft. During normal operating conditions, the gimbal 202 takes all of the load between the actuator 100 and the aircraft, i.e. it provides a primary load path (PLP). If the gimbal 202 fails, the upper attachment 204 instead takes all of the load between the actuator 100 and the aircraft. That is, the upper attachment 204 provides a redundant connection, i.e. secondary load path (SLP), between the actuator 100 and the aircraft, that is not loaded until the gimbal 202 (or other part) of the primary load path fails.

The lower portion 300 comprises a primary attachment 302 and a secondary attachment 304. During normal operating conditions, the primary attachment 302 transfers load from the actuator 100 to a trimmable horizontal stabilizer (THS) (not shown). The primary attachment 302 transfers load between the THS and a primary nut of the actuator 100. The primary nut is seated on the screw shaft 102 and transfers load between the primary attachment 302 and the screw shaft 102. If the primary nut fails, a secondary nut that is connected to the secondary attachment 304 engages with the screw shaft 102. The secondary attachment 304 then transfers load between the actuator 100 and the THS. That is, the secondary attachment 304 provides a redundant connection, i.e. secondary load path, between the actuator 100 and the THS. "Normal operation" is generally defined herein as the case where load through the actuator 100 follows the primary load path.

Failure of the primary load path in the upper portion 200 is generally independent of failure of the primary load path in the lower portion 300. Thus, for example, failure of the primary nut in the lower portion, such that the secondary nut has to bear load, is independent of whether the gimbal 202 if loaded or if the upper attachment 204 is loaded at the upper portion 200.

FIGS. 2A and 2B show views of the upper portion 200 from the known actuator 100 of FIG. 1. The upper portion 200 comprises the gimbal 202 and the upper attachment 204. The upper attachment 204 forms or is directly connected to a yoke 206. A tie bar 208 extends along a center of the screw shaft 102 and is connected for rotation therewith. The tie bar 208 has a ball-shaped upper or first end 210 that is housed inside the yoke 206. That is the yoke 206 defines an internal cavity 212 that is larger than the ball-shaped end. The yoke 206 has an aperture 206a that is sized such that the ball-shaped end 210 cannot move out of the yoke 206. During operation of the actuator 100, the screw shaft 102 rotates and therefore so does the tie bar 208. During operation of the actuator 100, the upper attachment 204 and yoke 206 do not rotate. To avoid wear to the yoke 206 and the ball-shaped end 210 as a result of rubbing, there is a gap 214 between the ball-shaped end 210 and the yoke 206. During normal operation, the gimbal 202 transfers all of the load from the actuator 100 to the frame of the aircraft and, as a result of this loading, the gimbal 202 may elastically deform to some extent. Further, under different operating temperatures, the gimbal 202 and other parts of the actuator 100 may thermally expand/contract. The gap 214 is sized so that, even under the aforesaid thermal/loading deformations of the gimbal 204, the ball-shaped end 201 does not contact the yoke 206.

Figure 6:
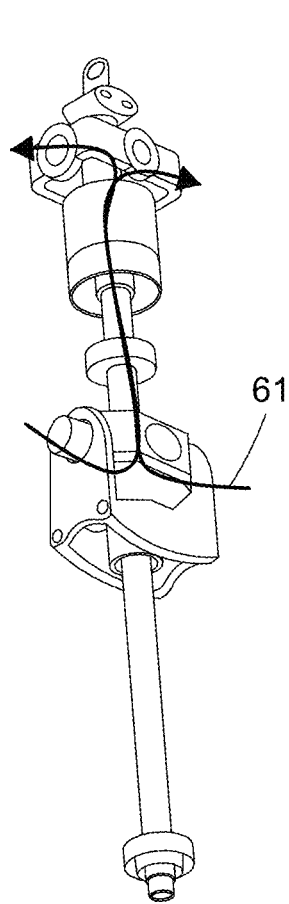
FIG. 6 shows the primary load path of a known actuator such as that shown in FIGS. 1, 2A and 2B.
Figure 7:
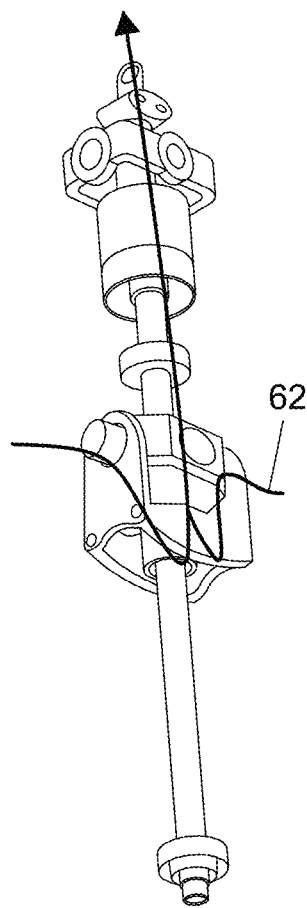
FIG. 7 shows the secondary load path of a known actuator such as that shown in FIGS. 1, 2A and 2B

During normal operation, the gimbal 202 provides a primary load path 61 between the actuator 100 and the frame of the aircraft, as shown in FIG. 6. If the gimbal 202 becomes damaged or breaks, e.g. due to wear or fatigue, then the upper attachment 204 provides a backup connection between the actuator 100 and the frame of the aircraft. That is, the upper attachment provides a secondary load path 62 (shown in FIG. 7) that is not engaged (loaded) during normal operation that is shown in FIG. 6. If the gimbal 202 fails, then the (secondary) load path 62 from the aircraft to the THSA goes: from the frame of the aircraft; into the upper attachment 204; through the yoke 206; into the ball-shaped end 210 of the tie bar 208; into the screw shaft 102; into the nut(s); into to the primary 302 or secondary attachment 304 (depending on any failure in the lower portion 300); and into the THS.

The gap 214 provides room for free movement between the ball-shaped end 210 and the yoke 206 and this region of free movement allows the THS to flutter under aerodynamic loading when the secondary load path is engaged.

Figure 3B:
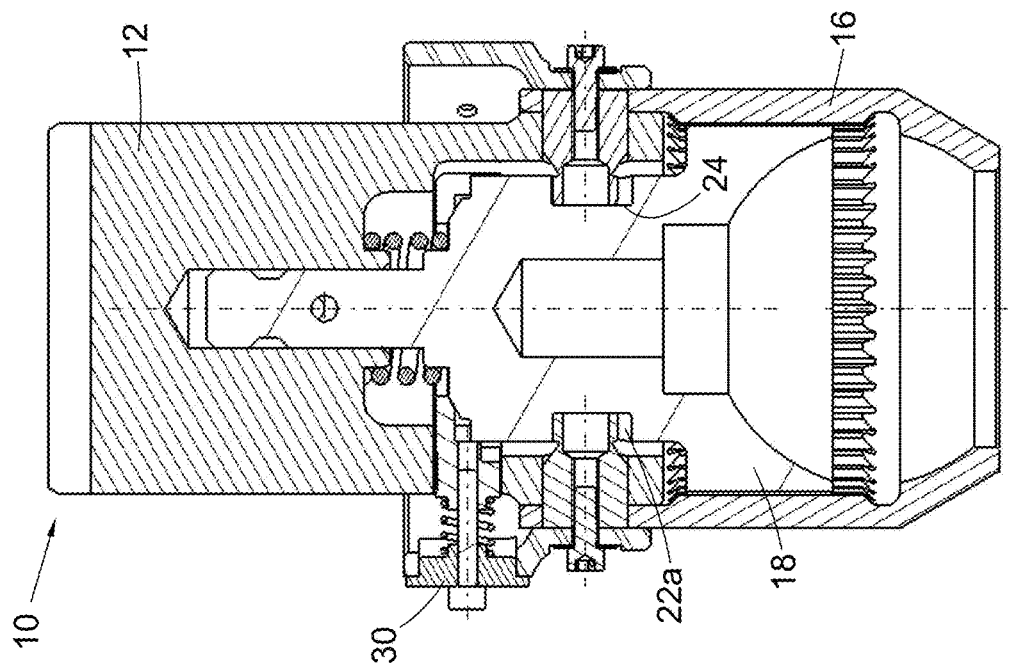
FIGS. 3A and 3B show cross-sectional views of an upper attachment according to the present disclosure when the primary load path is engaged.
Figure 3A:
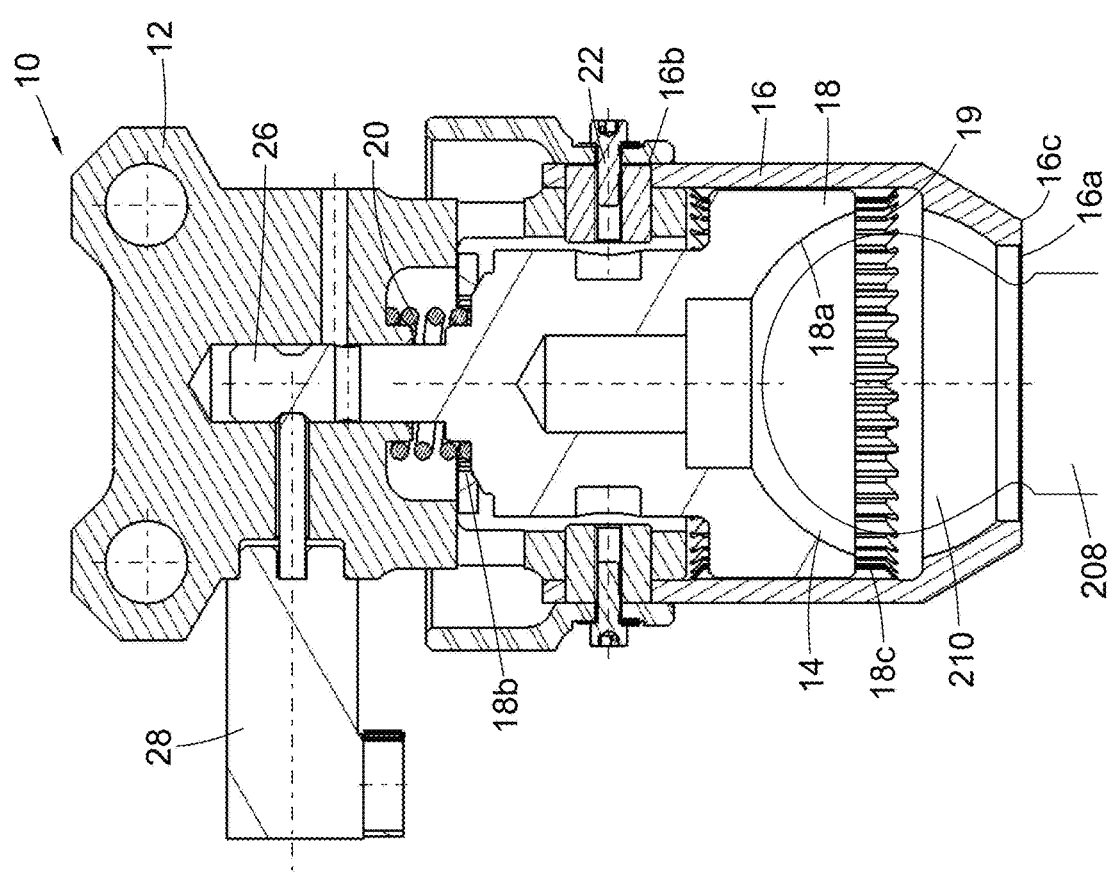

A new type of upper attachment will now be described with reference to FIGS. 3A to 5. FIGS. 3A and 3B show cross-sectional views of a new type of upper attachment 10 according to the present disclosure. The upper attachment 10 of the present disclosure is usable with many parts of the above-described actuator 100, such as the gimbal 202, tie rod 208, the ball shaped-end 210 of the tie rod etc. Therefore, where like pieces may be used, like reference numerals will be used too. As described in detail below, the upper attachment 10 according to the present disclosure comprises features that allow for the existence of a gap 14 (similar to gap 214 described above) during normal operation but that then close the gap 14 when the secondary load path is engaged. This can reduce flutter of the THS when the secondary load path is engaged in the upper portion of the actuator.

The upper attachment 10 has a connection portion 12 for connecting to the frame of the aircraft. The connection portion 12 may be formed integrally with or may be fixedly connected to an outer yoke portion 16. The outer yoke 16 has a first end 16b and an opposite, second end 16c, with an aperture 16a provided at the second end 16c, through which the tie bar 208 extends. The outer yoke 16 defines an internal cavity 15 that, inter alia, substantially encloses the ball-shaped end 210 of the tie bar 208. The aperture 16a is sized so that the ball-shaped end 210 of the tie bar 208 cannot be removed from the outer yoke 16. An inner yoke 18 also has a first end 18b and an opposite second end 18c and the inner yoke 18 is also located in the internal cavity 15 of the outer yoke 16. The inner yoke 18 can translate within the cavity 16 but is blocked in rotation. For example, the inner yoke 18 may connect to the outer yoke 16 by a splined connection 19. The inner yoke 18 has an internal surface 18a that faces the ball-shaped end 210 of the tie bar 208.

During normal operation, the ball-shaped end 210 is substantially surrounded by but spaced from the outer yoke 16 and inner yoke 18, by a gap 14. Therefore, the ball-shaped end 210 can rotate within the yokes 16, 18 without touching either yoke 16, 18 and therefore not experiencing any wear from friction.

A spring 20 is located inside the cavity 15 between connection portion 12 and the inner yoke 18 and the spring 20 biases the inner yoke 18 towards the aperture 16a of the outer yoke 16. That is, the spring biases the inner yoke 18 towards the ball-shaped end 210 of the tie bar 208.

During normal operation, to prevent movement of the inner yoke 18 towards the aperture 16a, shearable means, which in this example comprises fuse pins 22 are provided that extend in a transverse direction (i.e. transverse in comparison to the axis of the inner yoke 18 between its first and second ends) through and into the cavity 15 (e.g. through the outer yoke 16 or through the connection portion 12) and engage with respective indentations 24 of the inner yoke 18. The indentations 24 are slightly larger than the fuse pins 22 such that there is a gap 22a between the lower side of each fuse pin 22 (i.e. on a side distal from the spring 20) and the edge of its respective indentation 24. This gap 22a allows a technician to test parts of the mechanism of the upper attachment 10 as described in more detail below.

If the primary load path 61, e.g. gimbal 202, fails, then the screw shaft 102 will no longer be held in its axial position by the gimbal 202 and will therefore move (slightly) under aerodynamic loads on the THS. This causes movement of the ball-shaped end 210 of the tie bar 208 within the inner and outer yokes 16, 18. If the aerodynamic loading is such as to pull the screw shaft 102 away from the frame of the aircraft, then the ball-shaped end 210 of the tie bar 208 will pull against the aperture 16a of the outer yoke 16 and prevent the screw shaft 102 from moving any further away from the aircraft frame. If the aerodynamic loading is such as to push the screw shaft 102 towards the frame of the aircraft, then the ball-shaped end 210 of the tie bar 208 will push against the surface 18a of the inner yoke 18 and try to force the inner yoke 18 further into the cavity 15 of the outer yoke 16. This force will shear the fuse pins 22.

If (when) the screw shaft 102 is subsequently pulled away from the frame of the aircraft (e.g. due to aerodynamic loading on the THS), such that the ball-shaped end 210 of the tie bar 208 abuts against the aperture 16a, the spring 20 will push the inner yoke 18 into abutment with the ball-shaped end 210 of the tie bar 208. This closes the gap 14. The ball-shaped end 210 is thus held on one side by the aperture 16a of the outer yoke 16, and on another side by the inner surface 18a of the inner yoke 18. At this point, latch means, which in the example shown in FIG. 3B are spring hooks 30 are mounted to the outer yoke 16 and inside the cavity 15 latch the inner yoke 218 in this new position. As a result, the tie bar 208 is now held with minimal backlash, while the secondary load path is engaged. This position is depicted in FIGS. 5A and 5B.

The ball-shaped end 210 is able to rotate (with friction against the yokes) within the yokes 16, 18 and so the actuator is not jammed when the secondary load path is engaged in this manner.

A pin portion 26 of the inner yoke 18 extends away from the aperture 16a. A sensor 28 is fixedly attached to the outer yoke 16 or connection portion 12 and senses a position of the pin portion 26 of the inner yoke 18. When the inner yoke 18 is moved by the spring 20, the pin portion 26 moves relative to the sensor 28 and the sensor detects this movement. For example, the pin portion may have a target 26a along its length that, wherein when the SLP is not engaged, the target 26a is aligned with a detector part 28a of the sensor 28. When the SLP is engaged, the target 26a moves away from the detector part 28a, and this movement is detected by the sensor 28. The sensor 28 may then output a signal indicating to an aircraft controller (not shown) that the secondary load path in the upper attachment 10, has engaged. This may allow the aircraft controller to take an appropriate decision, e.g. that the SLP is engaged in this actuator and so it may be preferable to prioritize use of other actuators on the aircraft so as to reduce the risk of further failure in that actuator. Among other things, this signal may be used for scheduling maintenance/replacement/repair of the gimbal 202 and the rest of the primary load path.

FIGS. 4A and 4B show perspective views of the upper attachment 10. FIG. 4A shows a view with the outer yoke 18 removed to better display the features inside the cavity 15. The fuse pins 22 are shown engaging the apertures 24 of the inner yoke 18. The spring 20 is shown as a coil spring surrounding the pin portion 26. The spring hooks 30, and the springs 31 that move the spring hooks 30 are depicted. FIG. 4B shows the upper attachment 10 with the connection portion 12 and outer yoke 16 present.

The gap 22a between the fuse pins 22 and the edge of the indentations 24 allows testing of the upper attachment 10, e.g. as part of maintenance or certification procedures. An engineer can insert a tool into the cavity 15 and move the inner yoke 18 within the cavity 15. This can cause the target 26a on the pin 26 to move relative to the sensor 28, such that the sensor 28 may be tested. This can also test the resiliency of the spring 20. This can also test for any jamming between the inner and outer yokes 16, 18. All of these tests may be performed without shearing the fuse pins 22.

What is claimed is:

1. An attachment assembly for connecting an actuator to a frame, the attachment assembly comprising:
    an outer yoke having a first end and an opposite second end and defining an internal cavity at said second end, the outer yoke having an aperture provided at its second end leading into said cavity; and
    an inner yoke located within the cavity, said inner yoke having a first end and a second, opposite end; and
    a tie bar having a ball shaped end, the tie bar extending through said aperture such that the ball shaped end is positioned within the cavity and cannot pass through the aperture, and a spring provided at said first end of said outer yoke that is configured to bias the inner yoke in the direction of said aperture;
    the attachment assembly further comprising:
    shearable means for holding the inner yoke in a first position wherein the inner yoke is spaced away from the ball-shaped end of the tie bar;
    wherein, when the tie bar is loaded against the inner yoke, the shearable means are configured to shear and the spring is configured to move the inner yoke to a second position wherein the inner yoke is in abutment with the ball-shaped end; and
    the attachment assembly further comprising:
    latching means that is configured to hold said inner yoke in said second position when said shearable means has been sheared.

2. The attachment assembly of claim 1, wherein the latching means comprises one or more spring hooks, the, or each, spring hook being mounted to the attachment assembly with a spring biasing the spring hook towards the inner yoke.

3. The attachment assembly of claim 2, wherein, when the inner yoke is in the second position, the spring of the, or each, spring hook moves the spring hook to abut the first end of the inner yoke to prevent movement of the inner yoke away from the ball-shaped end.

4. The attachment assembly of claim 1, wherein the shearable means comprise one or more fuse pins.

5. The attachment assembly of claim 4, wherein each fuse pin extends in a transverse direction and engages with a respective indentation formed in the inner yoke, wherein each indentation is larger in an axial direction than an axial size of the fuse pin, such that a gap is provided between an axial edge of the fuse pin and an edge of the indentation, and such that the inner yoke may be moved against the bias of the spring without shearing the or each fuse pin.

6. The attachment assembly of claim 1, wherein a sensor is configured to detect movement of the inner yoke away from the first position, and to output a signal indicating that a secondary load path is engaged when the inner yoke moves away from the first position.

7. The attachment assembly of claim 6, wherein the sensor comprises a sensor portion that abuts a target formed on the inner yoke when the inner yoke is in the first position, and wherein the sensor portion does not abut the target when the inner yoke is in the second position.

8. The attachment assembly of claim 1, wherein the inner yoke is blocked against rotation relative to the outer yoke.

9. A method of manufacturing an upper attachment of an actuator, the method comprising:
    providing an outer yoke having a first end and an opposite second end and defining an internal cavity at said second end, the outer yoke having an aperture provided at its second end leading into said cavity; and
    providing an inner yoke within the cavity, said inner yoke having a first end and a second, opposite end;
    providing a tie bar having a ball shaped end, the tie bar extending through said aperture such that the ball shaped end is positioned within the cavity and cannot pass through the aperture;
    providing a spring at said first end of said outer yoke that is configured to bias the inner yoke in the direction of said aperture;
    providing a shearable means for holding the inner yoke in a first position wherein the inner yoke is spaced away from the ball-shaped end of the tie bar;
    wherein the shearable means is configured to shear when the tie bar is loaded against the inner yoke, and the spring is configured to move the inner yoke to a second position wherein the inner yoke is in abutment with the ball-shaped end; and
    further comprising providing latching means that is configured to hold said inner yoke in said second position when said shearable means has been sheared.

10. The method according to claim 9, wherein the latching means comprises spring hooks that are configured to move and abut the first end of the inner yoke.

11. The method according to claim 9, further comprising providing a sensor that is configured to sense movement of the inner yoke away from the first position.

12. The method according to claim 9, wherein the shearable means comprises one or more fuse pins, and the method further comprises positioning each of the one more fuse pins so the it extends in a transverse direction and engages with a respective indentation formed in the inner yoke, wherein each indentation is larger in an axial direction than an axial size of the fuse pin, such that a gap is provided between an axial edge of the fuse pin and an edge of the indentation;
    the method further comprising providing means for testing the upper attachment, said means comprising the inner yoke being configured to move within the cavity without shearing the or each fuse pin.

13. A method of reducing backlash in an upper attachment of an actuator when a secondary load path is engaged, the method comprising:
    mounting a ball-shaped end of a tie bar in a cavity of an outer yoke having a first end and an opposite second end, the outer yoke having an aperture provided at its second end connected to said cavity; wherein a movable inner yoke is located within the cavity;
    biasing the inner yoke towards the aperture;
    holding the inner yoke in a first position wherein the inner yoke is spaced away from the ball-shaped end of the tie bar by shearable means;
    shearing the shearable means when the tie bar is loaded against the inner yoke, such that the inner yoke moves to a second position under the bias to a second position wherein the inner yoke is in abutment with the ball-shaped end;
    latching the inner yoke in the second position.

14. The method according to claim 13, wherein the step of latching the inner yoke in the second position comprises spring hooks moving to abut a first end of the inner yoke.

15. The method according to claim 13, comprising sensing, using a sensor, movement of the inner yoke away from the first position.

\* \* \* \* \*